Jan. 26, 1960 L. H. MORIN 2,922,596
MOLDED PLASTIC SPOOLS

Filed June 22, 1953 3 Sheets-Sheet 1

INVENTOR.
LOUIS H. MORIN

BY Howard Thompson
ATTORNEY

Jan. 26, 1960 L. H. MORIN 2,922,596
MOLDED PLASTIC SPOOLS
Filed June 22, 1953 3 Sheets-Sheet 2
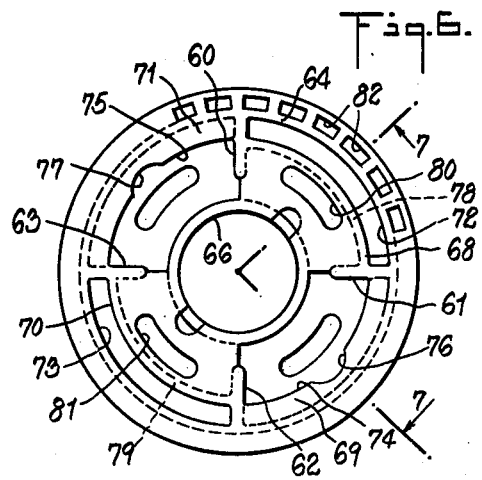
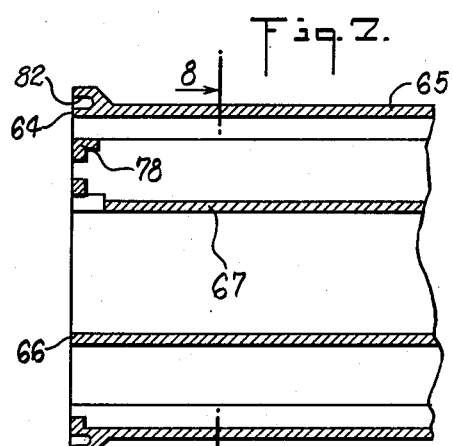
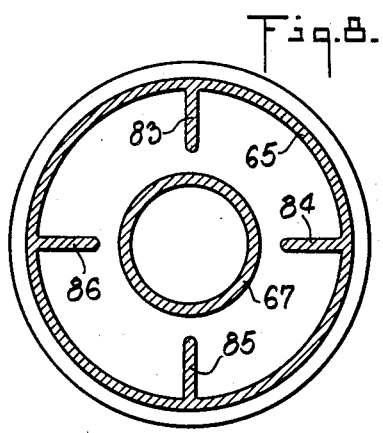
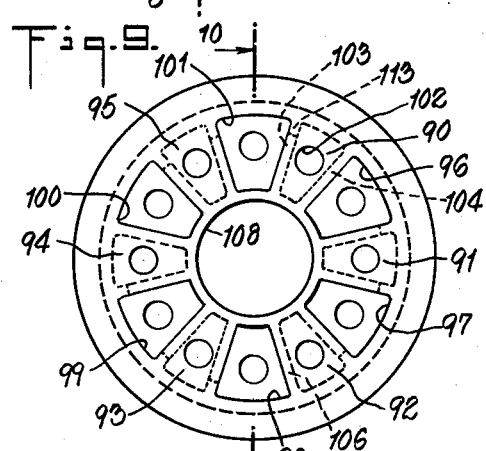
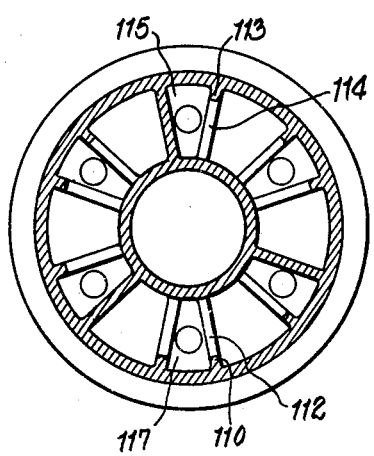
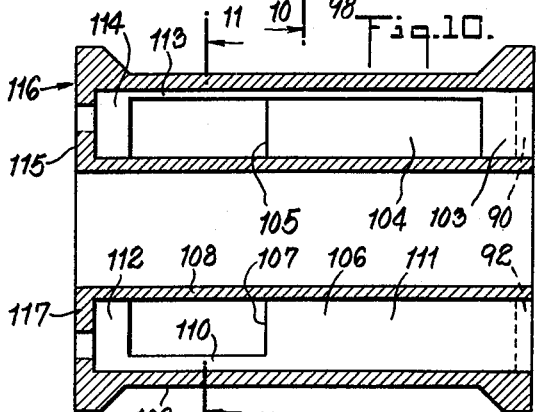
INVENTOR.
LOUIS H. MORIN
BY
Howard E. Thompson
ATTORNEY Jan. 26, 1960     L. H. MORIN     2,922,596
MOLDED PLASTIC SPOOLS
Filed June 22, 1953     3 Sheets-Sheet 3
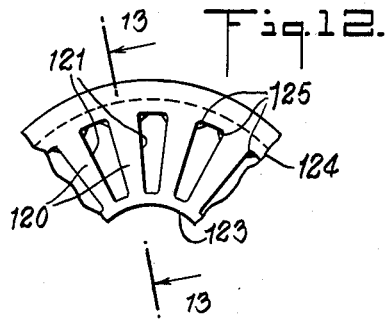
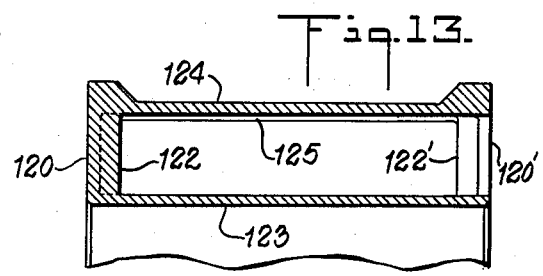
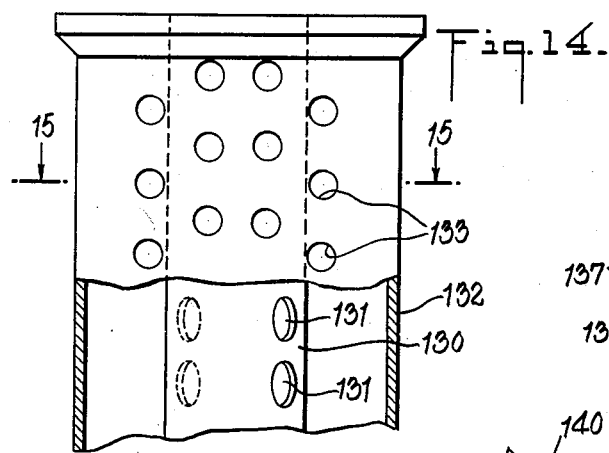
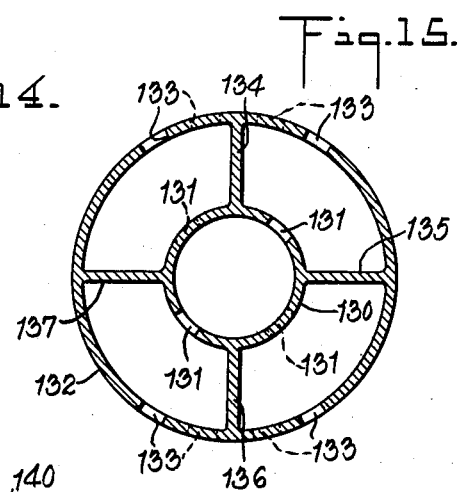
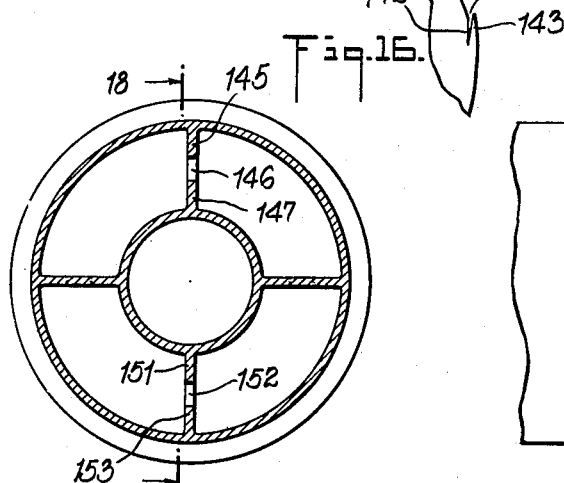
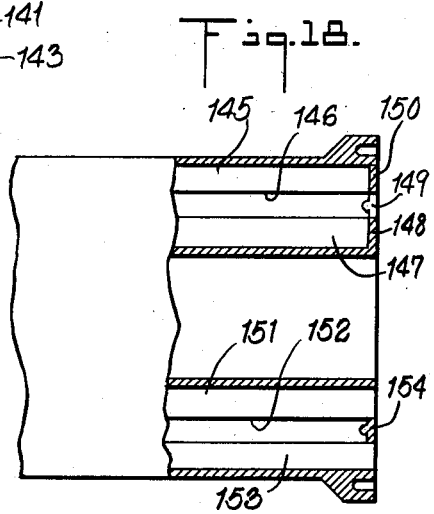
INVENTOR.
LOUIS H. MORIN
BY
*Howard Thompson*
ATTORNEY United States Patent Office 2,922,596
Patented Jan. 26, 1960

2,922,596

MOLDED PLASTIC SPOOLS

Louis H. Morin, Bronx, N.Y., assignor to Coats & Clark, Inc., New York, N.Y., a corporation of Delaware Application June 22, 1953, Serial No. 363,363

2 Claims. (Cl. 242—118.7)

This invention relates to spools commonly employed for the mounting of thread thereon, and particularly to the production of a reinforced lightweight hollow spool body in the form of a molded plastic member. Still more particularly, the invention deals with a spool structure having ribbed end wall portions joining inner and outer tubes of the spool body and presenting at the ends of the spool flat surfaces upon which conventional labels are adapted to be mounted.

Still further, my invention comprises the formation of a spool body wherein one set of ribs is joined by other ribs in strengthening and reinforcing end wall structures of the spool body.

The novel features of the invention will be best understood from the following description when taken together with the accompanying drawing, in which certain embodiments of the invention are disclosed, and in which the separate parts are designated by suitable reference characters in each of the views, and in which:

Fig. 6 is an end view of another modification;

Fig. 7 is a cross-sectional view along the line 7—7 of Fig. 6;

Fig. 8 is a cross-sectional view along the line 8—8 of Fig. 7;

Fig. 9 is an end view of another modification;

Fig. 10 is a longitudinal sectional view along the line 10—10 of Fig. 9;

Fig. 11 is a cross-sectional view along the line 11—11 of Fig. 10;

Fig. 12 is a fragmental end view of another modification;

Fig. 13 is a longitudinal sectional view, in part, along the line 13—13 of Fig. 12;

Fig. 14 is a broken away, partial view of another modification showing a part of the barrel and of one end portion of the spool;

Fig. 15 is a cross-sectional view along the line 15—15 of Fig. 14;

Fig. 16 is an enlarged, fragmental view of an end of a spool showing a thread nick therein;

Fig. 17 is a transverse sectional view of another modification; and

Fig. 18 is a sectional view along line 18—18 of Fig. 17.

Figure 1:
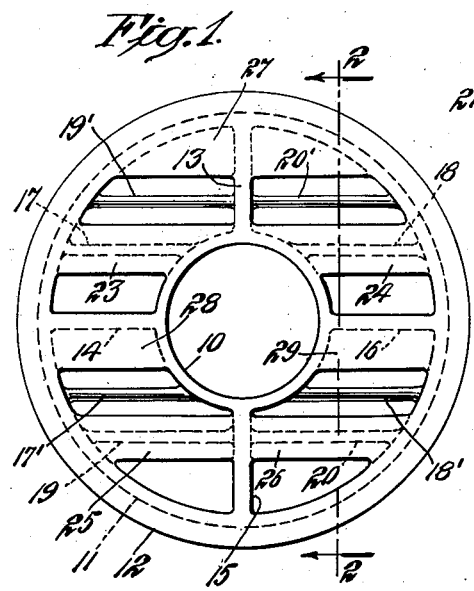
Fig. 1 is an end view of one form of spool which I employ indicating part of the opposed end wall of the spool to illustrate arrangement of reinforcing ribs, one with respect to the other at opposed ends of the spool.
Figure 2:
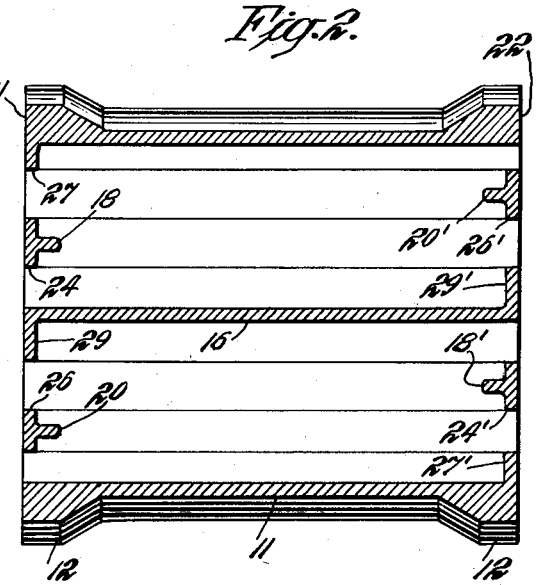
Fig. 2 is a section on the line 2—2 of Fig. 1.

In Figs. 1 and 2 of the drawing, I have shown a molded spool body comprising an inner tube 10, an outer tube 11, the latter terminating at the ends of the spool in outwardly extended bevelled rims 12 of the general cross section noted in Fig. 2. The inner and outer tubes 10 and 11 are joined at the ends of the spool body by a series of members in the form of ribs or webs, four of the ribs or webs being radially disposed as seen at 13, 14, 15 and 16, whereas two ribs 17 and 18 extend parallel to the ribs 14 and 16 and directly join the tubes 10 and 11, and another pair of ribs 19 and 20 are parallel to ribs 14 and 16 and join the outer tube 11 with the rib 15. The ribs or webs 13, 14, 15 and 16 extend the full length of the spool, note for example the section through the rib 16 in Fig. 2 of the drawing, whereas the ribs 17 to 20 are short ribs and are disposed only at the end 21 of the spool, and the opposed end 22 has corresponding ribs, as for example at 17', 18' and 19' and 20'.

At the ends 21 and 22 of the spool, the ribs 17–20 and 17'–20' have extended wide surfaces flush with the rimmed ends of the spool, and these surfaces can be referred to as end wall portions 23 on 17, 24 on 18, 25 on 19, and 26 on 20, corresponding end wall portions being provided on the ribs 17'–20', the end wall portions on the ribs 18' and 20' only being shown in Fig. 2 of the drawing and are identified by the reference characters 24' and 26'. Integral with the rib or web 13 is an end wall portion 27, note Fig. 1 of the drawing; the corresponding but opposite end wall portion is integral with the rib 15, and this is noted at 27' in Fig. 2 of the drawing. It will also appear that extending downwardly from the ribs or webs 14 and 16, as noted in Fig. 1, are end wall portions 28 and 29 respectively and corresponding end wall portions extend upwardly from the ribs 14 and 16 at the opposed end of the spool, one of these walls being indicated at 29' in Fig. 2 of the drawing. Thus collectively, the end wall portions in combination with the rim provide relatively large surface areas at the ends of the spool for mounting of labels thereon.

It will be apparent from a consideration of Fig. 2 of the drawing that opposed ends of the spool have openings which register with the respective ribbed end wall portions so that in molding the spool, the interfitting cores will be movable through these openings and extend to and partially form said ribbed end wall portions.

Figure 3:
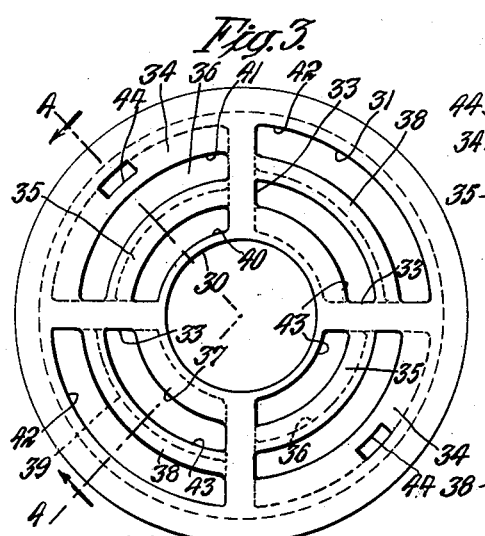
Fig. 3 is a view similar to Fig. 1 showing only the appearance of one end of a modification of the spool.
Figure 4:
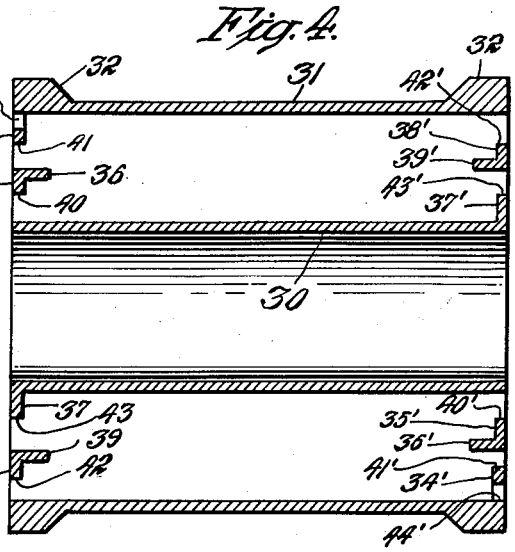
Fig. 4 is a section on the broken line 4—4 of Fig. 3.

In Figs. 3 and 4 of the drawing, I have shown a modification of the structure shown in Figs. 1 and 2. In these figures, 30 represents the inner tube of the spool, 31 the outer tube, the latter terminating at its ends in outwardly extending annular rims 32. As noted in Fig. 3, the inner and outer tubes 30, 31 are joined by four longitudinal, radially extending, ribs or walls 33, similar to ribs 13 to 16 of Figs. 1–2, the outer ends of which are flush with the end surfaces of the rims 32. The walls 33 divide each end face or wall of the spool into two pairs of opposed end sections, one pair of sections having radially inwardly extending end wall portions 34, note Fig. 3, integral with the outer tube 31, and these sections have curved end wall portions 35 extending between adjacent walls 33, the wall portions 35 having inwardly extending ribs 36, note Fig. 4 of the drawing. In contrast, the other opposed pair of sections have radially outwardly extending end wall portions 37 integral with the inner tube 30 and curved end wall portions 38 similar to the wall portions 35, the latter including inwardly extending ribs 39 shown in section in Fig. 4 of the drawing. It is to be noted that in Fig. 4, no attempt is shown to illustrate the background showing of the several parts, and in like manner in Fig. 3 the opposed end wall of the spool is not shown, in order to simplify both of these showings. However, it will be understood that the opposed end of the spool will have two pairs of opposed end wall sections similar to those shown in Fig. 3 but arranged in the reversed relationship. Thus at the right-hand end of Fig. 4 is shown one of the radially outwardly extending end wall portions 37' similar to 37, and arc shaped end wall portion 38' similar to the end wall portion 38 with the rib 39' thereon, these being in alignment with the left-hand section having the wall portions 34, 35. At 34' is shown the radially inwardly extending end wall portion similar to 34, at 35' the arc shaped wall similar to 35, the latter having the rib 36' and these, as will be noted, are in alignment with the end wall portions 38 and 37, respectively. It is quite apparent from a consideration of Figs. 3 and 4 that the end wall portions 37, 37' are in alignment with the openings 40', 40 and the end walls 38, 38' are in alignment with the openings 41', 41. In like manner the end wall portions 34, 34' are in alignment with openings 42', 42 and the end wall portions 35, 35' are in alignment with openings 43', 43. All of the end wall portions 34, 34', 35, 35', 37, 37', 38, 38' have outer surfaces which are flush with end surfaces of the rims 32 as well as end surfaces of the radial walls 33, thus providing at both ends of the spool relatively large surface areas for the mounting of labels at the ends of the spool. The wall portions 34, 34' have centrally thereof openings 44, 44' which at their outer sides are flush with inner surfaces of the outer tubes, these openings being provided for support of cores, one with respect to the other, in the operation of molding the spool body. It will also be apparent that all of the end wall portions, which extend circumferentially, integrally join with the radial walls 33, as clearly shown in Fig. 3 of the drawing.

Figure 5:
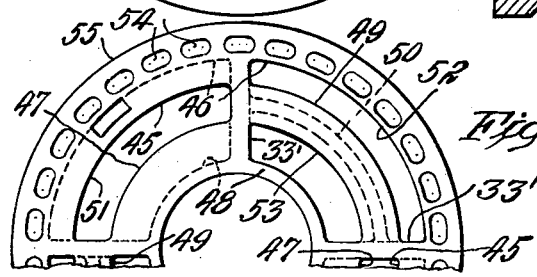
Fig. 5 is a partial end view of a modified spool.

In Fig. 5 of the drawing, I have shown a portion of one end of a modified form of spool which modifies the structure of Figs. 3 and 4 in providing two pairs of end wall sections, one pair having an inwardly extending end wall portion 45 on the outer tube 46 and an outwardly extending end wall portion 47 on the inner tube 48, whereas the other pair of sections simply has one arc shaped end wall portion 49 ribbed centrally as seen at 50, the latter joining the radial walls 33' similar to the walls 33. In other words, the wall portion 49 is in registering circumferential alignment with the opening 51 and will register with a corresponding opening at the opposed end of the spool the same as in Figs. 3 and 4 of the drawing. The openings 52 and 53 register circumferentially with the end walls 45 and 47, respectively.

In Fig. 5, the spool structure is further modified from that shown in Figs. 3 and 4 in providing circumferentially spaced recesses 54 in the outer surface of the rim 55 to lighten the spool and to provide a decorative effect. It will be apparent that the recesses 54 open only through the outer surface of the rims.

In the modification shown in Figs. 6-8, each end face or end wall of the spool has four radially arranged strips 60, 61, 62 and 63, each of which is integral with the annular end 64 of the flanged barrel 65 but is spaced from the annular end 66 of the inner tube 67. Each pair of adjacent strips is connected by an end wall portion, of which there are four, as indicated at 68, 69, 70 and 71. The portions 68 and 70 are connected to the inner tube 67 and are spaced from the annular end 64 of the spool by the spaces 72 and 73. The portions 69 and 71 are integral with the annular end 64 and are spaced from the inner tube by spaces 74 and 75. Cut-outs 76, 77 in the end wall portions 69, 71, respectively, have the same purpose as the openings 44 in Figs. 3 and 4. End wall portions 68 and 70 are provided with short longitudinally extending ribs, one of which is shown in section in Fig. 7 and indicated as 78. These end wall portions are also provided with weight-reducing, material-saving spaces 80 and 81, respectively. The construction of the opposite end face of the spool is similar to that shown in Fig. 6 except that the end wall portions and spaces are offset with respect to those in Fig. 6.

Decorative, weight-reducing, material-saving openings 82 are provided in the annular end 64 of the spool, as in the case of the spool of Fig. 5. It may be noted that these openings make it easier to nick the spool, as by providing a resilient or "give" effect when the nicking knives engage the flanged rim; also, the nicking knives are less apt to wear by virtue of being able to nick the resilient flanges with less pressure.

As in the case of the spools of Figs. 1–5, the combined area of the outer surfaces of the end wall portions of the spool of Figs. 6–8 is substantially the same as the combined area of the end wall spaces; each end face thus has sufficient surface area sufficiently distributed thereover as to enable end ticket labels to be adhered to the end face without sinking in.

As may be apparent from Figs. 6 and 8, the radial strips 60–63 represent the end or ends of the longitudinally extending ribs 83, 84, 85 and 86, respectively. These ribs extend from one end wall of the spool to the other, terminating in the end walls in the form of the radial strips indicated. The ribs are integrally formed with the barrel 65 but are spaced from the inner tube 67; the ribs need not extend to the tube because they still serve to strengthen the spool while at the same time enabling the weight to be reduced and material to be saved.

Summarizing Figs. 3–8, it may be seen that the alternate end wall portions and spaces are arc-shaped and that each is partially concentric with the inner tube and the outer barrel. Each end wall has four radially arranged strips which divide the end wall or face into quadrants, with diagonally opposed quadrants in each face being identical. Each of these quadrants has at least one of the arc-shaped portions and spaces, and these portions and spaces are offset relatively to those in an adjoining quadrant.

The spools of Figs. 1–8 are all characterized by having alternate end wall portions and spaces in each end face with the portions being attached to one or more of four radially arranged strips. The strips divide each end face into four sections, although the number of strips, and thus the sections, is variable.

In Figs. 9–11, the spool has end faces each of which is provided with six end wall portions alternating with six end wall spaces. As shown in Fig. 9, the end wall portions are designated 90–95 and the spaces 96–101. Each end wall portion is apertured, one aperture being shown at 102. (Apertures in the end wall portions of the opposite end faces are also shown, these portions being offset from portions 90–95, as described hereinafter.) Each end wall portion has a rib extending inwardly from each edge thereof, one of these ribs being short and the other long; both ribs extend transversely from the inner tube to the outer barrel. For the end wall portion 90, the short rib is indicated at 103 and the long rib at 104. Each long rib has an opening in it adjacent one end of the spool, and for rib 104 this opening is shown at 105 (Fig. 10). The opening may, perhaps, be more evident in the case of the long rib 106 of the end wall portion 92, the opening being designated as 107, note Fig. 10. As may be seen, for the long rib 106, the opening 107 does not extend completely from the inner tube 108 to the outer barrel 109 but stops short of the barrel, there being left a narrow rib portion 110 which connects the longer rib portion 111 with the short rib portion 112.

Referring again to the short rib 103 of the end wall portion 90, it may be seen from Fig. 10 that this short rib is connected by a narrow longitudinal rib 113 to a short rib 114 on the end wall portion 115 in the opposite end face 116.

As is apparent from Fig. 10, an end wall portion in one end face of the spool, for example the portion 90 or 92, is connected through a longitudinally extending rib to an end wall portion in the opposite end face, for example, the portion 115 or 117, respectively. Thus, portion 90 is connected to portion 115 through short rib 103, narrow rib 113, and short rib 114; and portion 92 is connected to portion 117 through the rib portion 111, the narrow rib portion 110, and a short rib portion 112.

The number of end wall portions in the end faces of the spool of Figs. 9–11 and the extensively ribbed construction help to provide a spool having excellent strength characteristics, while weight reduction and material savings are provided by the apertures such as 102, 105, and the large aperture such as the one between the short ribs 103 and 114, note Fig. 10.

In Figs. 12 and 13 the spool has an end face provided with a multiplicity of narrow, substantially wedge-shaped or spoke-like end wall portions 120 alternating with correspondingly shaped spaces 121. Each portion 120 is provided with a single centrally disposed rib 122, note Fig. 13, which extends transversely of the spool between the inner tube 123 and the outer barrel 124. In Fig. 13 the opposite end of the spool is shown as having an end wall portion 120', corresponding to end wall portions 120, and a rib 122', corresponding to ribs 122. Due to the narrowness of the spaces 121, end ticket labels can be well supported on this spool. Extending between opposite end wall portions of the spool are longitudinal members or ribs 125 which serve to stiffen the outer barrel 124. These ribs are integrally formed with the barrel, and as may be seen, each end wall portion is connected to two of such ribs, which ribs are connected to two adjacent end wall portions in the opposite end face of the spool. The spool not only has good ticket adherence characteristics but also is well adapted to meet the strength requirements of a spool of this type.

Summarizing Figs. 9–13, it may be seen that each end wall portion of the spools comprises a group of radially arranged spokes and spaces which extend from the inner tube to the flanged end of the barrel. The spokes in one end wall are offset with respect to the spokes in the other end wall, so that each spoke in one wall is in substantial alignment with a space in the other wall. Each spoke is tapered from its outer to its inner end. More particularly, each spoke comprises the sector of an annulus. If each such spoke is extended to the axial center of the inner tube of the spool, it will have substantially the shape of a sector of a circle, and the radii of the sector will define an angle which, for the spool of Figs. 9–11, is about 30° and for that of Figs. 12–13 is about 10°. It is preferred that this angle shall vary from about 8 to 20°, although it may range as high as 60°. Also, the end wall portions of these particular spools may have shapes other than those shown.

In Figs. 14 and 15, a barrel and tube construction is shown which is applicable to any of the foregoing spools and which involves the use of weight-reducing, material-saving openings both in the inner tube of the spool and in the outer barrel. As shown, the inner tube 130 is provided with appropriately spaced, somewhat elongated openings 131. Adjacent one end of the spool two openings are provided in one side of the tube and two on the opposite side; while adjacent the other end of the spool, this arrangement is reversed. The outer barrel 132 has circular openings 133 which are arranged in spaced longitudinal rows. The opposite side of the barrel has similarly arranged openings, as may be seen in Fig. 15. Longitudinal ribs 134–137 extend from the inner tube to the barrel and from end to end of the spool.

Fig. 16 shows a portion of one end face of a spool having a nick 140. The nick has a relatively wide mouth 141 and a sharp narrow inner end 142 for holding the thread. The outer wall 143 of the nick tends to be pushed outwardly by the nicking knife, forming a projection which is easily felt or located by the fingers and which, due to the plastic material of the spool, is not susceptible to being chipped or broken away as in the case of conventional wood spools. For all practical purposes nick 140 is non-chippable and is adapted to be placed in all of the spools described herein.

In Figs. 17 and 18 a modification of the spool of Fig. 5 is shown, the difference residing in the fact that a pair of opposite, longitudinally extending ribs, of the kind used in Fig. 5, are each divided in two portions to further reduce the spool weight and to economize material. In other words, two longitudinal ribs 145 and 147 are provided, being separated by a longitudinally extending central space 146. Similarly, ribs 151 and 153 are separated by the space 152. In Fig. 5, on the other hand, all of the ribs are like ribs 134–137 of Figs. 14–15. Fig. 18 shows the construction of the ribs 145, 147, 151 and 153 at one end portion of the spool. The portion 150 corresponds to the portion 45 of Fig. 5, and the portion 148 corresponds to the portion 47. At 149 is indicated the end of a ribbed end wall portion which would correspond to the upper right hand portion 49 of Fig. 5, and at 154 is shown a ribbed end wall portion corresponding to the lower left-hand portion 49 of Fig. 5.

Referring to all of the foregoing spool modifications, it will be apparent that in each case the spool is made of one piece. It is preferably composed entirely of plastic material, although it may be formed of other materials, including compositions containing plastic and additives. The end walls or end faces of each spool are integrally formed with, and connect, the tube and the barrel. Each end face comprises the annular end or edge of the tube, for example note 66 in Fig. 7, the annular end of the flanged barrel, for example note 64 in Fig. 7, and, intermediate the said annular ends, a group of alternate end wall portions and spaces. In other words, the annular end surface of the inner tube and the annular end surface of the flanged barrel lie in the same plane as the outer surfaces of the end wall portions. At least one end wall portion, and usually a plurality of such portions, is connected to an end wall portion in the opposite end face of the spool through a longitudinally extending member or rib; in each spool such rib is integral with the outer barrel. Also, at least one end wall portion of an end face is provided with a short rib for strengthening and rigidifying the ends of the spool, whereas the longitudinally extending ribs support and reinforce the barrel and tube of the spool. Each end wall portion of one end face of a spool is offset with respect to any of the portions of the other end face, so that each portion of one wall is in substantial alignment with a space in the other wall. In each spool the combined area of the outer surfaces of the end wall portions is substantially the same as the combined area of the end wall spaces, and thus each end face is provided with sufficient surface area sufficiently distributed over the face as to enable a ticket label to be adhered thereto. Each spool has a non-chippable, thread-holding nick in the periphery of at least one of its flanged ends. If desired, the inner tube and the outer barrel of each spool may have openings such as are shown in Figs. 14 and 15.

The present spools are particularly adapted for holding sewing thread for domestic use. They are light in weight, averaging much less than the weight of a wood spool, and economize material. Despite their lightness, they are unusually strong and rigid. They are capable of being produced in large quantities in a smooth, finished condition by a high speed casting operation.

The spools described above may be formed by means of cores such as are described in copending application Serial No. 363,364, filed June 22, 1953, now Patent No. 2,890,490, issued June 16, 1959.

Having fully described my invention, what I claim and desire to secure by Letters Patent is:

1. A one-piece all-plastic thread spool comprising an inner tube, an outer thread-holding barrel having flanged ends, and a pair of end walls integrally formed with and connecting the tube and barrel together; each end wall comprising the annular end of the tube and the annular end of the flanged barrel and also comprising intermediate said annular ends a group of alternate arc-shaped end wall portions and spaces each concentric with said tube and barrel, each end wall having four radially arranged strips dividing the end wall into quadrants with diagonally opposed quadrants in each end wall being identical, each quadrant having at least one of said arc-shaped portions and spaces, each said arc-shaped portion in one quadrant being offset relatively to a portion in an adjoining quadrant; the combined area of the outer surfaces of said end wall portions being substantially the same as the combined area of said spaces, each end wall having sufficient surface area distributed thereover to enable labels to be adhered thereto; and a plurality of said end wall portions in one end face of the spool each being connected to an end wall portion in the opposite end face through a longitudinally extending rib.

2. A one-piece all-plastic thread spool comprising an inner tube, an outer thread-holding barrel having flanged ends, and a pair of end walls integrally formed with and connecting the tube and barrel together; each end wall comprising the annular end of the tube and the annular end of the flanged barrel and also comprising intermediate said annular ends a group of alternate end wall portions and spaces, each end wall having four radially arranged strips extending from the tube to the barrel and dividing the end wall into sections, each section having at least one of said portions and spaces; each end wall having sufficient surface area distributed thereover to enable labels to be adhered thereto; a plurality of said end wall portions in one end face of the spool each being connected to an end wall portion in the opposite end face through a longitudinally extending rib, said rib comprising an unbroken, rectangularly shaped web extending from end to end of the spool and from the inner tube to the outer barrel.

References Cited in the file of this patent

UNITED STATES PATENTS

| | | |
|---|---|---|
| 1,028,877 | Herrick | June 11, 1912 |
| 1,520,379 | Wermine | Dec. 23, 1924 |
| 1,985,742 | Rea | Dec. 25, 1934 |
| 2,190,013 | Byers | Feb. 13, 1940 |
| 2,376,151 | Karle | May 15, 1945 |
| 2,465,573 | Brannon | Mar. 29, 1949 |
| 2,594,366 | Stienen | Apr. 29, 1952 |
| 2,693,918 | Bretson et al. | Nov. 9, 1954 |
| 2,750,129 | Morin | June 12, 1956 |

FOREIGN PATENTS

| | | |
|---|---|---|
| 24,868 | Great Britain | June 10, 1909 |
| 459,210 | Italy | Sept. 1, 1950 |
| 265,489 | Switzerland | Sept. 16, 1950 |